(No Model.) 6 Sheets—Sheet 1.

J. A. McANULTY.
FLOUR BOLT.

No. 546,241. Patented Sept. 10, 1895.

Witnesses
Levi P. White
J. H. Kuhl

Inventor
John A. McAnulty (No Model.) 6 Sheets—Sheet 2.

J. A. McANULTY.
FLOUR BOLT.

No. 546,241. Patented Sept. 10, 1895.

Witnesses
Levi R. White
J. R. Kuhl

Inventor
John A. McAnulty (No Model.) 6 Sheets—Sheet 3.
J. A. McANULTY.
FLOUR BOLT.

No. 546,241. Patented Sept. 10, 1895.

(No Model.) 6 Sheets—Sheet 4.

J. A. McANULTY.
FLOUR BOLT.

No. 546,241. Patented Sept. 10, 1895.

Witnesses
Levi P. White
J. R. Kuhl

Inventor
John A. McAnulty (No Model.) 6 Sheets—Sheet 5.

J. A. McANULTY.
FLOUR BOLT.

No. 546,241. Patented Sept. 10, 1895.

Witnesses
Lei. P. White
J. R. Ruhl

Inventor
John A. McAnulty (No Model.)  6 Sheets—Sheet 6.
J. A. McANULTY.
FLOUR BOLT.
No. 546,241.  Patented Sept. 10, 1895.
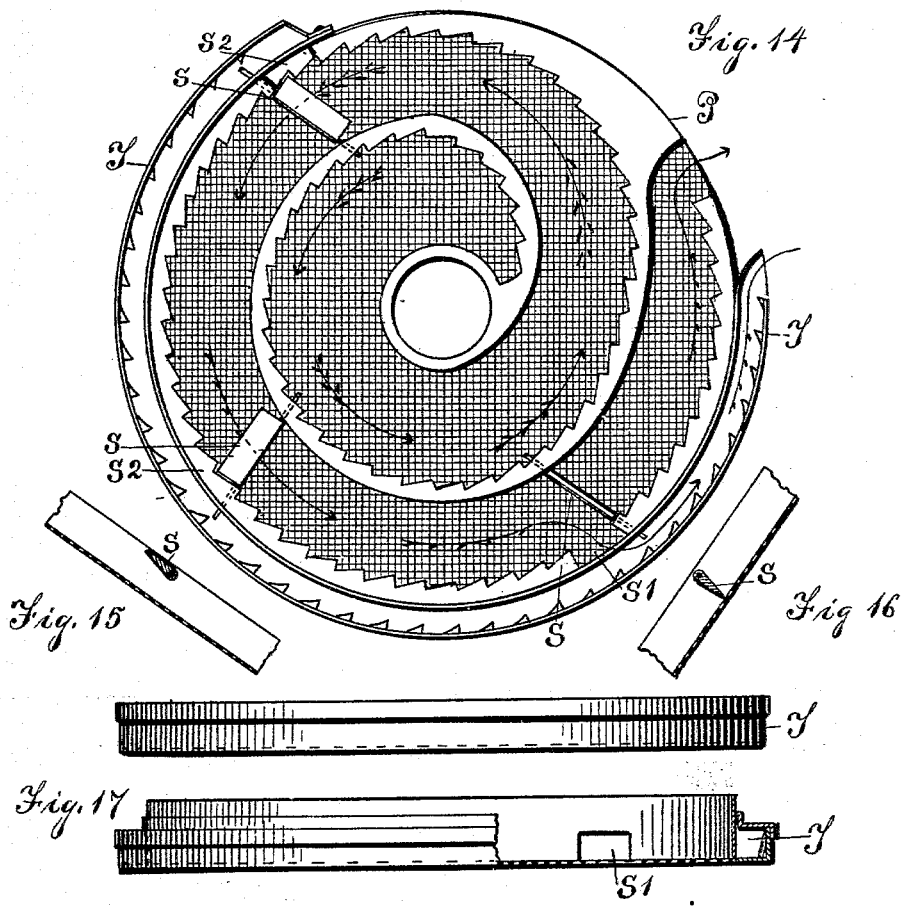
Witnesses  
Levi P. White  
J. R. Riehl
Inventor  
John A. McAnulty

UNITED STATES PATENT OFFICE.

JOHN A. McANULTY, OF MANHEIM, PENNSYLVANIA, ASSIGNOR TO JOHN A. McANULTY, OF SAME PLACE, AND J. HAMILTON SMALL AND W. T. NELSON, OF YORK, PENNSYLVANIA.

FLOUR-BOLT.

SPECIFICATION forming part of Letters Patent No. 546,241, dated September 10, 1895.

Application filed September 10, 1894. Serial No. 522,673. (No model.)

*To all whom it may concern:*

Be it known that I, JOHN ARMSTRONG MC-ANULTY, a citizen of the United States, residing at Manheim, in the county of Lancaster and State of Pennsylvania, have invented certain new and useful Improvements in Flour-Bolts, of which the following is a specification.

My invention relates to improvements in flour-bolts, and the object is to construct a gyrating-sieve machine capable of accomplishing all the separations required to be made in converting cereals into flour and other merchantable products. This object I attain by use of a device illustrated in the accompanying drawings, forming part of this specification, and in which similar letters refer to similar parts throughout the several views.

Figure 1:
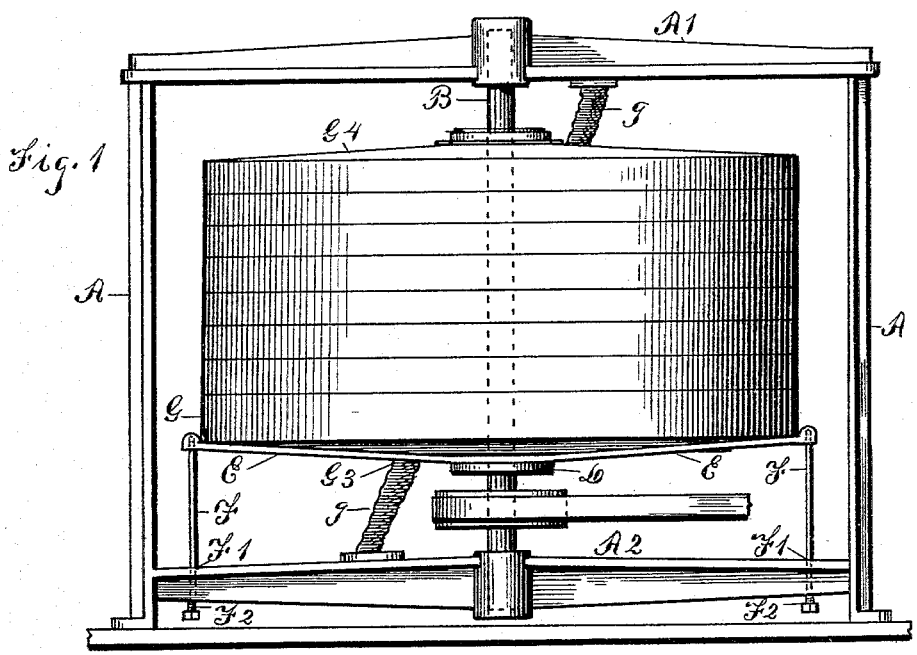
Figure 2:
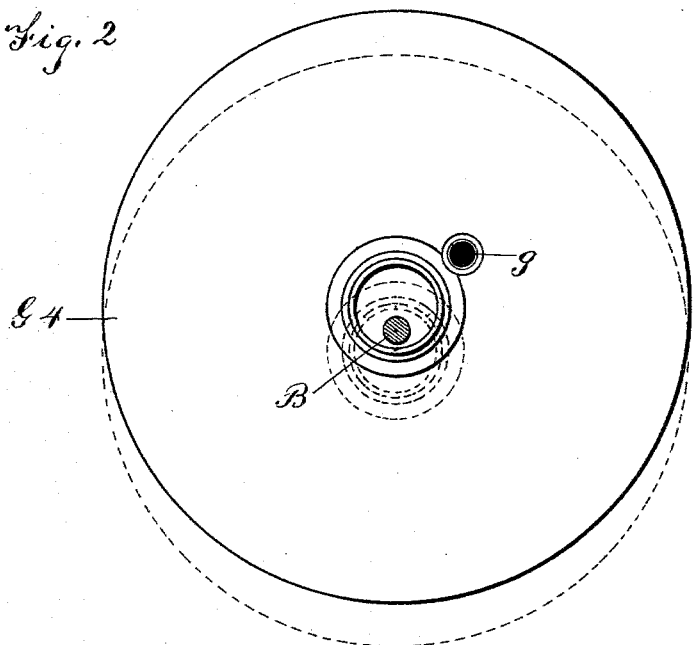
Figure 3:
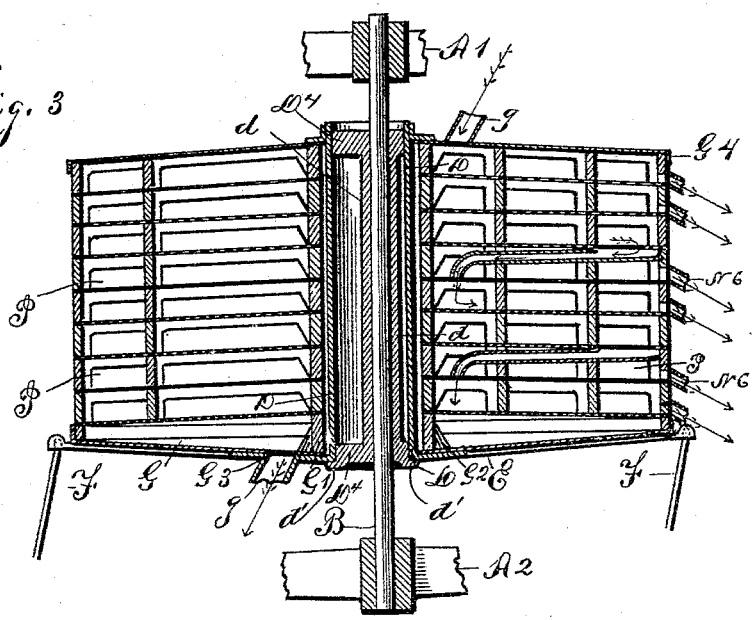
Figure 4:
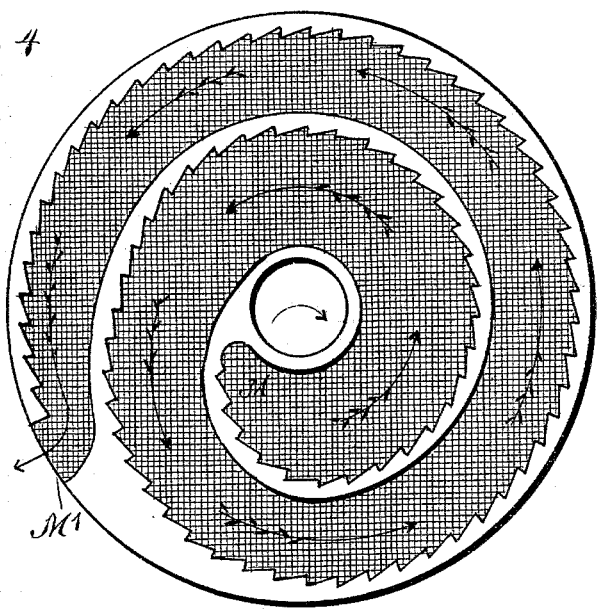
Figure 5:
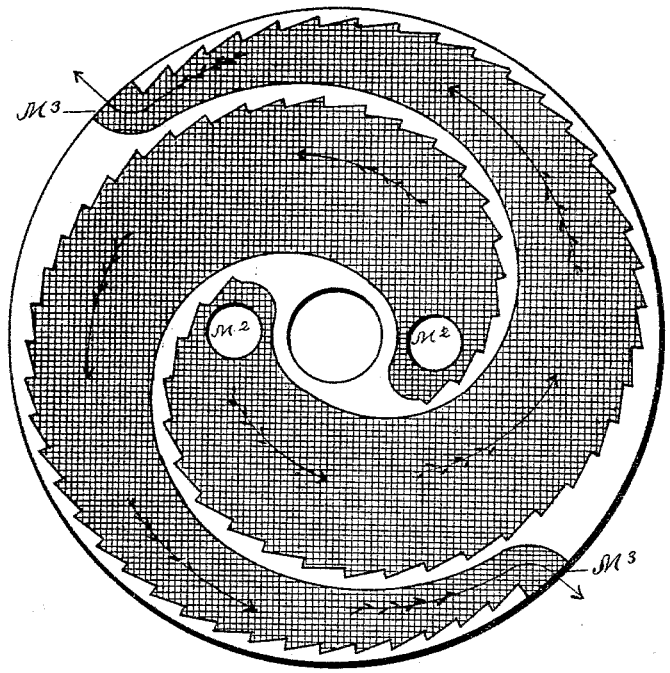
Figure 6:
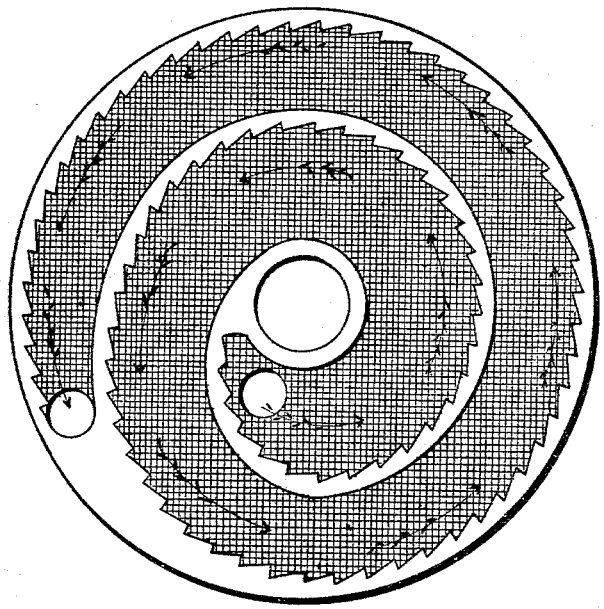
Figure 7:
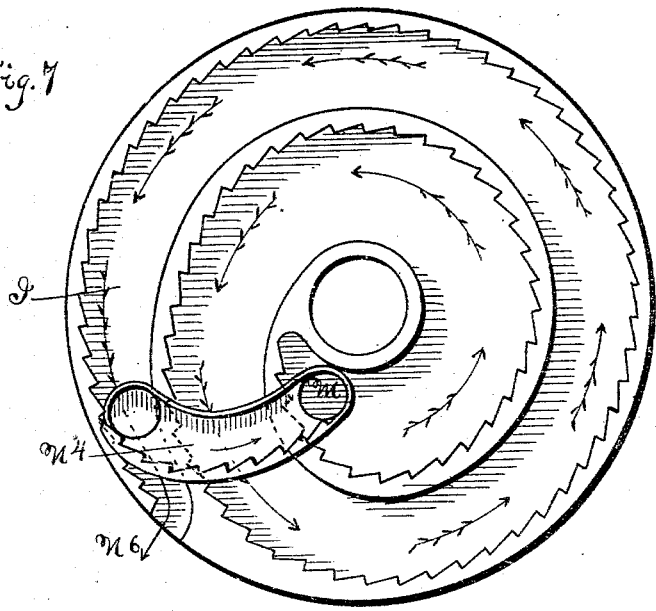
Figure 8:
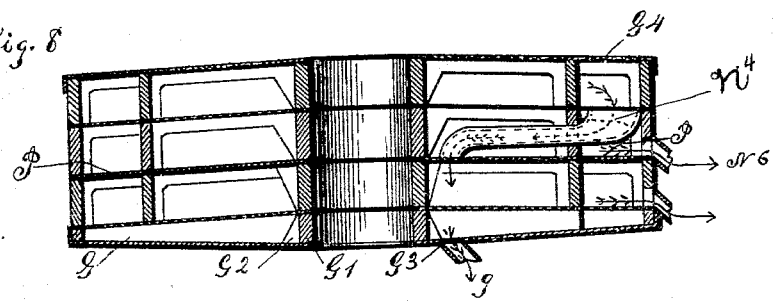
Figure 9:
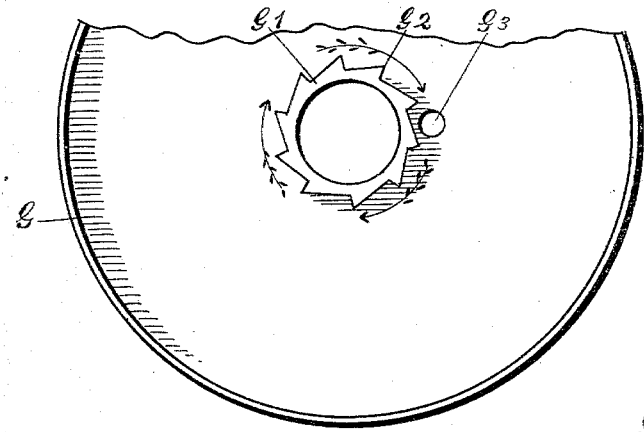
Figure 10:
Figure 11:
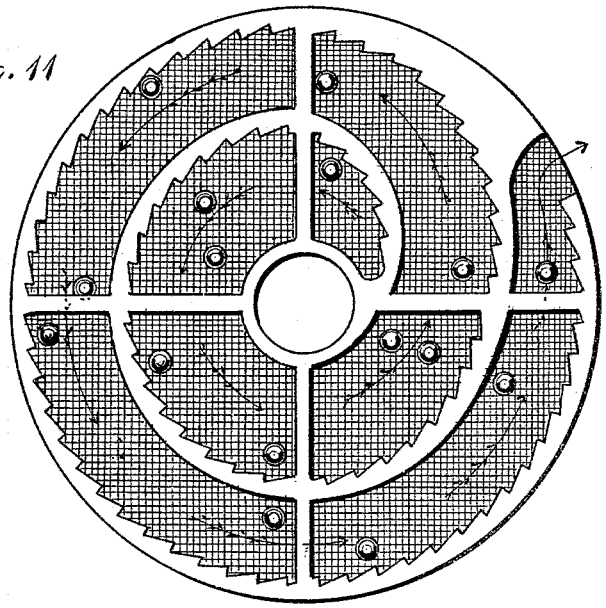
Figure 12:
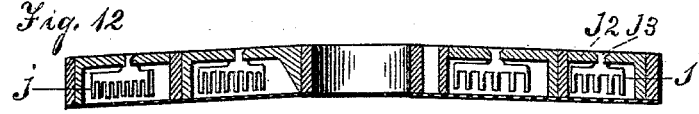
Figure 13:
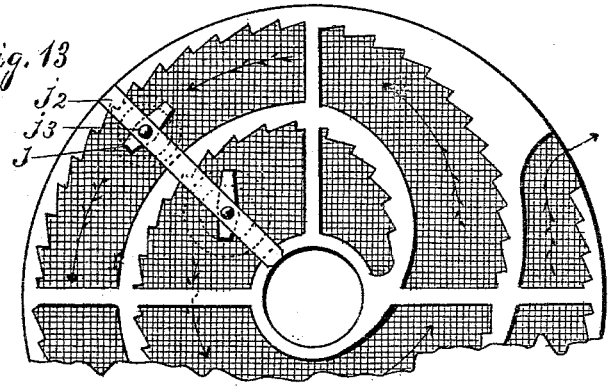

Figure 1 is a front elevation of a machine embodying my invention. Fig. 2 is a top view of the cover of the upper sieve with the eccentric in place therein, showing in dotted lines the throw of the eccentric and the change in position of the cover consequent thereon. Fig. 3 is a central sectional elevation of the machine. Fig. 4 is a top view of a one-section sieve having an outside discharge. Fig. 5 is a top view of a two-section sieve with outside discharges. Fig. 6 is a top view of a sieve having internal discharge. Fig. 7 is a top view of circular cant-board with outside discharge and conveyer. Fig. 8 is a sectional elevation of cant-boards and sieves. Fig. 9 is a top view of part of cant-board G. Fig. 10 is a section of sieve provided with cloth-cleaning device. Fig. 11 is a top view of the sieve shown in Fig. 10. Fig. 12 is a view in section of sieve provided with a disintegrating device. Fig. 13 is a top view of part of the sieve shown in Fig. 12. Fig. 14 is a top view of flour-discharge containing a cut-off gate S. Figs. 15 and 16 are sectional views showing the valves or gates S, Fig. 14, in open and closed position, respectively. Fig. 17 is a section of outside flour-conveyer.

A A represent the upright side rails of a framework of any suitable structure having top and bottom cross-ties A' and A², in which is journaled an upright shaft B. Upon the shaft is keyed a casting composed of top and bottom eccentrics D⁴ connected by a tube $d$ which fits around the shaft. The lower eccentric has upon it a laterally-projecting annular flange $d'$, designed to support the gyratory sieve structure. To this end the eccentrics are loosely surrounded by an upright sleeve D which at its base rests upon the flange $d'$. Fast to and projecting laterally from the lower end of the sleeve are arms E upon which rests the series of superposed cant-boards and sieves—said cant-boards and sieves having central circular openings to fit around the sleeve D.

The sleeve D and its arms E are prevented from partaking of the rotary movement of the eccentric shaft B by any customary or suitable means which will permit the same to have imparted to them the gyratory movement due to the rotation of the eccentrics D⁴. These means consist, in the present instance, of the metallic spring-bars F, having their headed upper ends seated in downwardly-opening cup-shaped sockets at the outer extremities of the arms E. The bars F have their lower ends fitted in sockets F' in the bottom cross-tie of the frame, under which sockets adjusting-bolts F² are arranged to raise and lower the bars at will. Rotary motion is imparted to the eccentric shaft by belt and pulley or other suitable gearing from some prime mover.

The series of cant-boards and sieves, as above stated, are supported upon the arms E and are centered upon the sleeve D. They are thus held and supported upon the rotary eccentric shaft from which their gyratory movement is derived. Directly upon the bars or arms E rests the bottom cant-board G, which may be constructed lower at its outer circumference than near the central part, but is preferably raised somewhat higher at the outside circumference, canting downward toward the central part, in which is fastened an annular hub or circular piece of framework G', Fig. 9, to which the cant-board is attached and to which is attached cleats G² around its outer circumference, forming a conveyer, which, when the machine is in motion, causes any material precipitated into the cant-board to be moved around the circle until it comes to a discharge-opening G³, formed in the bottom of the cant-board for the discharge of any material precipitated into it through a sieve or spouted into it from above.

The cant-board G forms a base upon which may be mounted one or more sieving-frames of like or of different patterns, adapted to the proper separation of the several kinds or classes of material to be operated upon, as well as intermediate cant or discharge devices for carrying off the finished products. The terminating upper sieve is provided with a cover $G^4$ having openings formed in its surface to receive the feed and to which flexible receiving-spouts $g$ are attached.

The sieve adapted to receive one stream of material only is constructed, as shown in Figs. 3 and 4. It has in the center an annular rib forming in effect a sleeve which encircles and fits around the eccentric on the driving-shaft. To this central annular rib is connected the inner end of a serrated rib which thence extends in a spiral path to the periphery of the sieve around which it circularly extends. The spiral may make a partial, an entire, or several turns around the central ring.

The serrated surface of the ribs may be formed by making depressions in their inner faces or by attaching to the inner faces of the ribs cleats of wood or metal, which perform all the functions of flights used in longitudinal conveyers and which direct the course of material passing over a silk or wire gauze which forms the bottom of the sieve. An opening for the discharge of material passing over the sieve is formed at $M'$, Fig. 4. When the material is to be discharged inside of the machine, as shown in Fig. 6, an opening is formed in the gauze at a point near the periphery of the sieve, as shown in Fig. 6. When used as the upper of a series of sieves, a cover containing one receiving-spout is attached in such a manner as to deliver the feed at M. (See Figs. 4 and 7.)

The sieve adapted to be used where several streams of material are to be treated in one sieve has a plurality of serrated ribs, (two, as shown in Fig. 5,) which depart from opposite sides of the central ring in spiral paths to join their respective outer circularly-curved ribs, which partly circumscribe the sieve, thus forming two separate spiral passages which may be clothed throughout with cloth of uniform mesh, or each may be clothed with material of different mesh, as the separations may require. The sieve when used as the upper one of a series of sieves is provided with a cover $G^4$, containing two or more receiving-spouts arranged to deliver the feed to the head of each passage at $M^2$, all of which passages are provided with discharge-openings $M^3$. Where in one machine two or more flouring-sieves succeed one another and the unbolted material is to be delivered from the sieve above to the succeeding sieve below, and the finished flour is to be conveyed out to the outside circumference of the machine, a circular discharge cant-board I, Figs. 7 and 8, is used between such sieves. This board is preferably made of a light metal sheet of the same size and form of the sieves and having corresponding serrated ribs. In the outer part of this discharge cant-board is fitted a curved tubular conveyer $N^4$, extending from immediately under the discharge-opening from the sieve above to the inlet or feed point M of the sieve below. This tubular conveyer, as shown in Fig. 7, has flights attached to the inside of its greatest curved wall, and having a feed-opening in its top at the outer end to receive the feed from the sieve above and a discharge-opening at its inner end to fit over an opening formed in the bottom of the cant-board immediately over the feed-point of the next sieve under it, through which all unbolted material passing off at the discharge from the upper sieve is delivered to the next sieve below, while the finished flour bolted through the upper sieve is discharged at $N^6$. (See Figs. 7 and 8.) Where cut-offs are to be made toward the discharge on account of the flour being of a less valuable quality, cant-boards having cut-off valves and conveyers to carry the cut-off material to one common point are required to be used. Such cant-boards are made in the same manner as above described, but have valves or gates S hinged in the upper part of the outer section of the cant-board, as shown in Figs. 14, 15, and 16. The valves when turned downward close the passage-way and the flour is discharged out through openings $S'$, made in the outer rib of each, into a conveyer T, attached to the outside wall of the cant-board and having a discharge at its extreme end for all materials received into it.

The conveyer T is preferably a light metal U-shaped circular trough with a removable top, and having flights attached to the inside of its outer wall to forward the flour toward the discharge, as shown in Figs. 14, 15, and 17. The openings S may be closed by means of doors $S^2$ made to fit neatly in the openings formed in the ribs of the cant-board.

The sieve surface is preferably made to incline slightly downward from the inside toward the outside, which tends to cause the material to bear outward against the flights which catch and throw it inward and onward toward the discharge with each revolution of the eccentric shaft, and consequent gyration of the sieve. The pitch given to the sieves should vary according to the quality of the material being separated, the greater pitch being required for use in separating the coarser materials.

I do not limit my invention to the use of sieves having the decline or pitch downward toward the outer circumference, as sieves having a straight surface will work well, although with less capacity than those formed as above described.

In separating material that is rough, such as coarse broken grain, the cloth or gauze will remain free and open, but in separating the finer ground materials, fluff from flour or pure from impure flour, the cloth is liable to become clogged up. To prevent this I place upon the cloth a number of balls, which by the motion of the machine are kept in motion, and by their contact with the cloth and material under treatment, keep the cloth clean. To keep the balls in proper bounds, racks are attached to the sieve-rings and ribs, as shown in Figs. 10 and 11, which extend down sufficiently close to the cloth to prevent the balls from passing under them and beyond their intended limit.

In separating lumpy, flaky, or fluffy material, which is required to be more severely acted upon, to disintegrate the parts adhering together, I attach to the sieves used for such purposes a disintegrating device J, which is made in the form of a comb, and which is swiveled at $J^3$ to supports $J^2$, which are attached to the ribs of the sieving-frames, or it may be swiveled nearer to one end of the comb than the other, which, by being out of balance, will be revolved at a rapid rate of speed, owing to the gyratory motion imparted to the sieve carrying the disintegrator. The teeth are directly in the pathway of the material, and the latter thereby will be broken asunder and disintegrated, so as to admit of the flour being bolted out finely. The balls and the swiveled combs can be used in the same structure to act successively upon the material passing through said structure.

In operation the motion communicated to the eccentric shaft revolves it toward the right, which will gyrate all parts of the sieve in that direction. The action of the flights on the material passing over the sieve will cause the material to travel in an opposite direction to that of the gyratory movement of the sieve, as indicated by arrows. The metallic bars F are preferably made of spring-steel, giving them elasticity, and being held rigidly in the socket F' they prevent the sieve from revolving around the eccentric shaft and hold the sieve to uniform gyratory movement, whose limit is determined by the throw of the eccentric. The bars F may also be used to sustain a part or all of the weight of the sieve or sieves and cant-boards mounted upon the bars E. The sieves and cant-boards, however, are supported independently of these bars, as before described, on the flange of the eccentric. The material is fed to the upper sieve through flexible spouts or conductors at the heads of the several sections of the sieves, from which it is forwarded by the gyratory motion given the sieve and the action of the flights, which, with each revolution of the eccentric shaft, carry onward all material coming in contact with them. Where only one separation is desired to be made, but one sieve mounted upon the circular cant G is used, tailing the coarser material off through the outside discharge from the sieve and sifting the finer particles through into the cant-board G to be delivered out at $G^3$. Where two or more separations are to be made a series of sieves, with intervening discharge cant-boards, are used to deliver out of the machine the products from the finishing sieves, as shown in Fig. 3, which is adapted to the separation of broken wheat containing bran, middlings, and flour. The bran is discharged from the upper sieve of the series over coarse cloth, the second sieve of the series being clothed with finer cloth discharges the middlings of the size corresponding to the germs of wheat grains, all finer material sifting through the second sieve of the series drops onto a finishing silk, clothing the third sieve. The finished flour passing through this sieve is conveyed out by means of the cant-board I, situated under the third sieve, while all the material not bolted out is dropped through the sieve's discharge-opening into the conveyer $N^4$, which passes it on through the cant-board I to the head of the fourth or the next sieve below the cant-board. The fourth sieve may be clothed to carry over a third grade of middlings, which is finished preparatory to being purified. All material sifting through the fourth sieve drops into the fifth sieve, which is also clothed to bolt through finished flour, which is discharged out by means of a second cant-board I. The unbolted material is again conveyed back and discharged into the head of the lower sieve, which is also clothed with silk sufficiently fine to bolt through finished flour, and all unbolted material from this sieve is discharged out, finished, or prepared for purification or regrinding.

Having thus described my invention, what I claim as new, and desire to secure by Letters Patent, is—

1. In a flour bolt the combination with an eccentric shaft for giving gyratory motion to the sieves, of a sieve supporting frame sleeved centrally upon and supported by the eccentric shaft and means whereby said frame is held against rotation while permitting gyratory movement, substantially as and for the purposes hereinbefore set forth.

2. In a flour bolt, an eccentric shaft for giving gyratory motion to the sieve or sieves provided with a sieve supporting flange or shelf, in combination with a sieve structure sleeved centrally upon the eccentric shaft and supported by the flange or shelf thereon, and means for holding said structure against rotation, substantially as and for the purposes hereinbefore set forth.

3. In a flour bolt the combination with an eccentric shaft for giving gyratory motion to the sieve or sieves; the sieve structure sleeved centrally thereon, and controlling spring bars attached to the frame of the machine and connected to said structure for restraining the latter from rotation while permitting it to gyrate, substantially as set forth.

4. In a flour bolt, the combination with serrated ribs extending spirally from the center to the circumference of the sieve, and netting forming the bottom of the sieve, of racks attached to said ribs, and balls placed on the netting and between the racks, substantially as set forth.

5. In a flour bolt the combination with serrated ribs extending from the center to the circumference of the sieve, and netting forming the bottom of the sieve, of swiveled combs J substantially as and for the purposes hereinbefore set forth.

6. In a flour bolt, a cant board provided with spirally arranged serrated ribs, an outer discharge opening, a feed opening in its bottom, and the conveyer $N^4$, substantially as set forth.

7. In a flour bolt, the combination of the cant board G the sieves mounted thereon, and provided with spiral serrated ribs as described, the interposed cant board I, and the conveyer $N^4$ extending from immediately under the discharge opening of the sieve above through the cant board I to the inlet or feed point of the sieve below, substantially as set forth.

8. In a flour bolt, a cant board having spirally arranged serrated ribs, valves S, discharge openings in the ribs back of the valves, and external conveyer T with which said openings communicate, substantially as and for the purposes hereinbefore set forth.

JOHN A. McANULTY.

In presence of—
M. E. BORNLERGER,
A. H. SHENCK.